United States Patent [19]

Taylor et al.

[11] Patent Number: 5,211,129

[45] Date of Patent: May 18, 1993

[54] SYRINGE-IMPLANTABLE IDENTIFICATION TRANSPONDER

[75] Inventors: Vern Taylor, Broomfield, Calif.; Daniel Koturov; John Bradin, both of Colo.; Gerald E. Loeb, Clarksburg, Md.

[73] Assignees: Destron/IDI, Inc.; Hughes Aircraft Co., both of Boulder, Colo.

[21] Appl. No.: 647,617

[22] Filed: Jan. 25, 1991

Related U.S. Application Data

[63] Continuation of Ser. No. 267,726, Oct. 26, 1988, abandoned, which is a continuation of Ser. No. 135,563, Dec. 24, 1987, abandoned, which is a continuation of Ser. No. 832,684, Feb. 25, 1986, abandoned.

[51] Int. Cl.$^5$ .................. A01K 61/00; A61M 5/00
[52] U.S. Cl. .................. 119/3; 606/117; 128/655; 128/899
[58] Field of Search .......... 128/654, 655, 656, 899; 606/116, 117; 119/3

[56] References Cited

U.S. PATENT DOCUMENTS

| | | | |
|---|---|---|---|
| 4,065,753 | 12/1977 | Paul, Jr. | 606/116 X |
| 4,909,250 | 3/1990 | Smith | 606/117 |
| 4,920,670 | 5/1990 | Amick | 119/3 X |
| 4,955,396 | 9/1990 | Fralick et al. | 606/117 X |

Primary Examiner—Robert P. Swiatek
Attorney, Agent, or Firm—Earl C. Hancock

[57] ABSTRACT

An improved transponder for transmitting an identification of an animal or the like is described which is sufficiently miniaturized to be syringe-implantable, thus avoiding the necessity of surgical procedures. The transponder comprises a coil which receives an interrogation signal and transmits an identification signal in response thereto. The transponder receives the energy required for transmission by inductive coupling to an interrogator. A single integrated circuit chip is provided which detects the interrogation signal, rectifies it to generate power needed for transmission, stores an identification of the transponder and hence of the animal in which it is implanted, and generates a frequency-shift-keyed, Manchester encoded identification signal in response to the interrogation signal. The device transmits the identification signal in real time, that is, immediately upon commencement of the interrogation signal, such that no discrete elements for energy storage are required. The transmission frequency and the bit rate are both determined by integer division of the interrogation signal such that no discrete elements such as crystal oscillators are required for signal generation.

27 Claims, 6 Drawing Sheets

SYRINGE-IMPLANTABLE IDENTIFICATION TRANSPONDER

This application is a continuation of U.S. patent application Ser. No. 07/267,726, filed Oct. 26, 1988, which is a continuation of U.S. Pat. Application, Ser. No. 07/135,563, filed Dec. 24, 1987, which is a continuation of U.S. patent application Ser. No. 07/832,684, filed Feb. 25, 1986, all three of which are now abandoned.

FIELD OF THE INVENTION

This invention relates to identification transponders for implantation into animals for their identification, useful in monitoring migratory patterns and for other purposes. More particularly, this invention relates to an identification transponder which is passive, meaning that it receives all its operating power from an interrogator device, which is sufficiently small as to be implanted by a syringe, thus avoiding the necessity of a surgical procedure, and which, upon interrogation, provides a signal indicative of the identity of the particular animal, and which is durable and reliable over a period of years.

BACKGROUND OF THE INVENTION

There are many applications in which a transponder which can be carried by an animal for automatic identification of the animal would be useful. Typical uses include monitoring migratory patterns of wild animals, for studying their habits, and for providing automatic identification of domestic animals, for controlling automatic feeding devices and the like, and for verifying their identity, e.g., in connection with racehorses. Automatically operated transponders would also be useful in connection with the monitoring of laboratory animals, for a wide variety of experimental purposes.

The prior art shows a number of transponders which provide identification of animals. However, no prior art device of which the inventors are aware includes all the attributes which would be desirable. See, for example, Fathauer U.S. Pat. No. 3,541,995 which shows a transponder which can be affixed to an animal's collar or the like for identifying it as belonging to a particular class. The Fathauer device is relatively large and bulky and not suitable for identification of wild animals.

Particularly in connection with the tracking of the movements of wild animals, it is desirable that transponders be provided which are extremely small and which can be readily implanted in the animals. An implantable transponder offers the advantage that it is not susceptible to loss and does not impede the motion of the animal. In particular, it would be desirable to provide transponders which are implantable in animals without the requirement of surgical procedures. To this end, Jefferts et al. U.S. Pat. No. 3,313,301 shows injection of a length of wire having magnetic properties into as animal by means of a syringe or generally similar device. See generally Jefferts et al. U.S. Pat. Nos. 3,128,744, 4,233,964, 3,820,545 and 3,545,405.

The presence of an animal having had a sliver of wire implanted therein can be detected automatically by an inductive coil or the like; however, the animal cannot be specifically identified in such an arrangement. Thus, it is not possible to track the movements of an individual animal, but only of a large number of them. Jefferts et al. U.S. Pat. No. 4,233,964 shows a similarly implantable tag which has grooves formed into its outer surface such that an individual animal can be identified by x-raying it and analyzing the groove pattern. This is obviously a very awkward system in use and does not lend itself readily to automatic monitoring of the movements of specific animals.

The prior art also includes transponders which provide an indication of the identity of a particular animal upon interrogation by an automatic interrogator device. Animal identification thus does not require operator intervention. See Hanton et al. U.S. Pat. No. 4,262,632 which shows a transponder for retention in the second stomach of a ruminant animal. The Hanton et al. transponder is adapted to be interrogated by an interrogator, to receive all operating power from the interrogator by means of an inductive coupling, and to transmit an identification signal in response to the interrogation. Hanton et al. also teach that such a transponder can be suitably encapsulated in glass for durability, another important aspect of devices of this type. However, the transponder of Hanton et al. is stated to be approximately three-quarters of an inch in diameter by three inches long. Such a transponder can only be implanted in an animal by a surgical procedure or by causing the animal to swallow it, e.g., by use of a conventional veterinary "balling gun." Such a transponder is not suitable for use in connection with wildlife, since it would be unduly complicated to apply these procedures to a large number of animals, such as fish, whose migratory patterns are to be studied. Not only is the Hanton et al. transponder too large for convenient implantation by means of a syringe or an automatic machine such as shown in some of the Jefferts et al. patents, but it is physically too large to be implanted into a relatively small animal such as a fish, a laboratory mouse, or the like.

A need therefore exists in the art for a transponder which is small enough to be syringe- or machine-implantable into a relatively small animal such as a fish, yet which provides an identification of the individual animal when interrogated by a suitable interrogator, such that the movements of individual animals can be studied by means of interrogators which record the animal's position without the intervention of a human operator.

It is therefore an object of the invention to provide a transponder which provides identification of an individual animal when it is interrogated, yet which is small enough to be syringe- or machine- implantable into an animal such as a fish.

It will be appreciated by those of skill in the art that it is important that a transponder for animal identification be durable in service, and it is accordingly an object of the invention to provide a transponder which is durable and reliable in service over a period of years, yet which is syringe-implantable and which provides an identification of the specific animal when interrogated.

Certain prior art transponders have relied on batteries for transmission of the identification signal. Other prior art transponders are powered by the interrogator itself by way of an inductive coupling. This is shown in Hanton et al. However, no reference known to the applicants shows a syringe-implantable transponder which is adapted to be powered by means of an inductive coupling to an interrogator, nor one in which the transponder additionally transmits an identification of an individual animal, and to provide the same is therefore an object of the present invention.

It is an important object of the present invention to provide a system for the monitoring of the movements of individual, small animals, for studying their migration patterns and the like, in which recordation of the movements of individual animals is possible and in which the data recording the movement of the individual animals is compiled without operator intervention.

Apart from the fact that prior art transponders which transmit identification signals are too large to be useful in connection with small animals, if they are to be used in connection with animals other than ruminants, they must be implanted surgically.

One of the significant drawbacks of surgical implantation of transponders is cost. A further disadvantage is the likelihood of infection, particularly in the case of wild animals or pets which are desirably released immediately after the surgery. Surgery also disfigures the animal to some extent, which is undesirable in the case of valuable animals. Surgery is psychologically traumatic to owners of domestic animals. For similar reasons, identification of the animals by ear tags and the like, which is generally within the prior art, is undesirable in the case of valued domestic animals and pets. Such external devices are also subject to loss.

For all these reasons, the art seeks a new identification transponder which is implantable by syringe or the equivalent, without surgical procedures, such that the transponder can be implanted in a simple and speedy manner, in which the chance of infection is greatly reduced, as compared to surgical implantation, in which the disfigurement of the animal is limited to an imperceptible pin prick, as compared to a scar left by surgery or the consistent undesired presence of an ear tag or the like. To eliminate these difficulties and deficiencies of the prior art in favor of simple syringe implantation of a transponder which nevertheless is durable in service, which does not require a battery, and which provides an identification of the individual animal are therefore important objects of the invention.

As mentioned above, the prior art also shows machinery for automatically implanting identification tags into animals such as fish. See Jefferts U.S. Pat. No. 3,820,545 and Debrotnik et al. U.S. Pat. No. 3,369,525. While such machinery would appear to have some utility, it is considered desirable to provide a transponder which is implantable using a relatively conventional syringe, which is less bulky and better suited for use in the field. In particular, it is an object of one aspect of the invention to provide a conveniently prepackaged, sterile cannula and identification transponder combination, such that the individual implanting the transponders into animals can be provided with all the equipment needed in a single sterile package which is used on a one-time basis; the cannula then being simply disposed of. In this way, sterility is ensured and operator convenience is optimized.

SUMMARY OF THE INVENTION

The present invention satisfies the needs of the art and the objects of the invention listed above by its provision of a subminiaturized transponder. The transponder comprises a coil, which serves as a receiving antenna, for receiving interrogation signals to activate the transponder and for receiving power for its operations. The same antenna is used to transmit the identification signal. A single complementary metal-oxide-semiconductor (CMOS) chip is provided and performs all circuit functions, including detection of the interrogation signal, conversion of the received signal to DC for powering of the transmitter operations, storage and provision of an identification code, generation of the transmission signal frequency, and modulation of the transmitted signal in accordance with the code and its transmission. The circuit transmits in real time, such that no discrete energy storage device is required; parasitic capacitance intrinsic to the CMOS chip is sufficient. The circuit divides the interrogation signal frequency by plural divisors to generate two frequencies which are used to provide a frequency-shift-keyed output signal, the transmission frequency varying in accordance with the stored identification signal. The transponder may be encapsulated in glass or a similarly durable material and in the preferred embodiment is 0.40" long and 0.080" in diameter. It may be supplied together with a disposable cannula for convenient syringe implantation into an animal. Together with essentially conventional interrogator and data storage equipment, a complete animal monitoring system is provided, suitable for monitoring migratory movements of wild animals as well as laboratory animals, pets and livestock.

It is readily apparent from the foregoing that, for such a system to function satisfactorily for any of the aforementioned purposes, the transponder must survive in the internal physiological environment of the host animal, fish or the like for monitoring periods that preferably are measured in years but, at the very least, extend over a plurality of months. To function in an acceptably reliable manner, the transponder must remain sealed against leakage thereinto by the internal fluids of the host throughout the aforesaid monitoring periods.

BRIEF DESCRIPTION OF THE DRAWINGS

The invention will be better understood if reference is made to the accompanying drawings, in which:

FIG. 8, comprising

DESCRIPTION OF THE PREFERRED EMBODIMENTS

As mentioned above, one of the objects of the invention is the provision of a transponder useful in a monitoring system for monitoring the movements of migratory animals such as fish. Large migratory populations require that the transponders used be relatively simply made, for reasons of cost and reliability, and very readily implantable. A further object of the invention is to provide such a monitoring system in which the movements of individual animals can be detected. This requires that the transponder provide an identification of the individual animal, not merely provide a signal which is indicative of the presence of an animal having had a transponder implanted.

Figure 1:
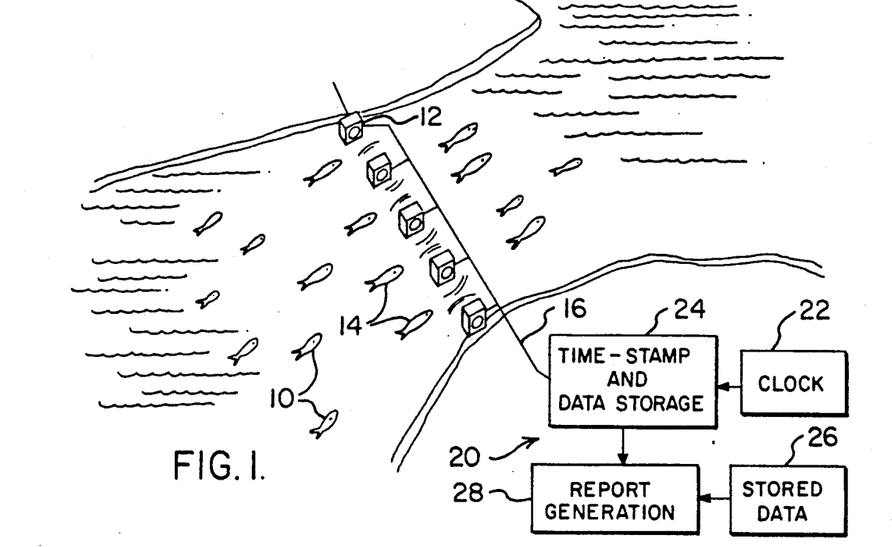
FIG. 1 shows an overall system for monitoring the movements of migratory fish.

FIG. 1 shows the main components of the monitoring system. A school of fish 10 is shown passing between a number of interrogators 12. Some fraction of the fish have transponders indicated generally at 14 implanted therein. The interrogators continually transmit an interrogation signal, which may be a simple constant frequency sine wave. When the fish having transponders implanted therein swim between the interrogators 12, energy is inductively coupled to the transponders 14, which thereupon transmit an identification code indicative of the identity of individual fish. These signals may be multiplexed and passed over a cable 16 to data processing apparatus indicated generally as 20. This may comprise a clock 22 and a time stamp and data storage device 24 for associating the identification of a fish with the time at which the fish passed the interrogator 12. The location of the interrogator would ordinarily be part of the overall data record produced as well. This information could be combined with data indicative of prior movements of the individual fish, stored as indicated at 26, and with the location at which the fish were originally supplied with transponders. Report generation means 28, typically an appropriately programmed digital computer, is then enabled to correlate this data in order to provide a report indicating the movement of the fish.

As shown in FIG. 1, a number of interrogators 12 are provided, and they are disposed in a relatively narrow channel. It will be appreciated that the interrogators are shown in schematic form. One preferred form of interrogator comprises a tube through which fish are constrained to swim in migratory movements, such as salmon migrating upstream to spawn, during which they are obliged to climb "ladders." The tubes can have inductive coils wrapped around them, continually emitting energy. When a salmon having a transponder implanted therein swims through the tube, the interrogator causes the transponder to transmit an identification of the fish, which can then be stored in time stamp and data storage unit 24 and used for subsequent report generation by report generator 28.

The report generator 28 can be of a wide variety of types, selected, for example, in accordance with specific research needs. For example, it might be desirable to determine to what extent individual salmon return to the rivers in which they were born for spawning. If individual salmon are captured and tagged with transponders capable of transmitting their individual identities in a given year, their subsequent return could be detected automatically by the system shown in FIG. 1. This may be instructively compared to a system in which a fish is tagged with a symbol which is readable by an operator. This requires that the operator capture the fish a second time to read the tag. According to the system shown in FIG. 1, the operator need only capture the fish a first time, at which time a transponder is syringe-implanted into the animal; thereafter, data generation and report generation may be entirely automated.

As discussed above, the prior art shows a number of transponders, some of which, such as those shown in the Hanton et al. patent, are capable of transmitting an identification signal indicative of the identity of a particular animal. However, all prior art transponders having this capability known to the applicant are far too large to be implanted in small animals such as fish and require surgical implantation or swallowing by the animal. Surgical implantation poses many difficulties. Expense is paramount; however, another difficulty is posed by the likelihood of infection, particularly where the animal is returned to the wild immediately after the implantation, which is, of course, highly desirable if at all possible. According to one aspect of the invention, there is provided a transponder which is syringe implantable. This avoids the trauma associated with surgery, and the wound in the animal is so small that infection is rendered substantially less likely. Moreover, syringe implantation avoids scarring or disfigurement of domestic animals, and is thus far less traumatic for both domestic animals and their owners than surgery, and is much less disfiguring, of course, than would be the adding of an ear tag or the like.

Figure 2:
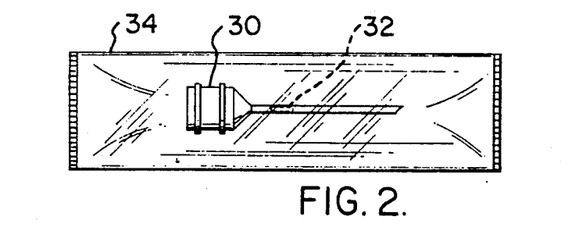
FIG. 2 shows a preferred sterile package for transponder implantation, including the transponder of the invention, together with a disposable, sterile cannula.

In order to reduce the expense of implanting transponders, operator convenience should be maximized, without compromising the goals of sterility and minimization of trauma to the animal. FIG. 2 shows a combination of a sterile cannula 30 with a sterilizable transponder 32 according to the invention, and as discussed in detail below, supplied already located within the tubular portion of the cannula. As shown, the cannula 30 with the transponder 32 packed therein can both be supplied together in a sterile package 34; this clearly will maximize the convenience of the operator, who needs merely to open the package 34, attach the ferrule of the cannula to a syringe, inject the transponder and throw the cannula away.

Figure 3:
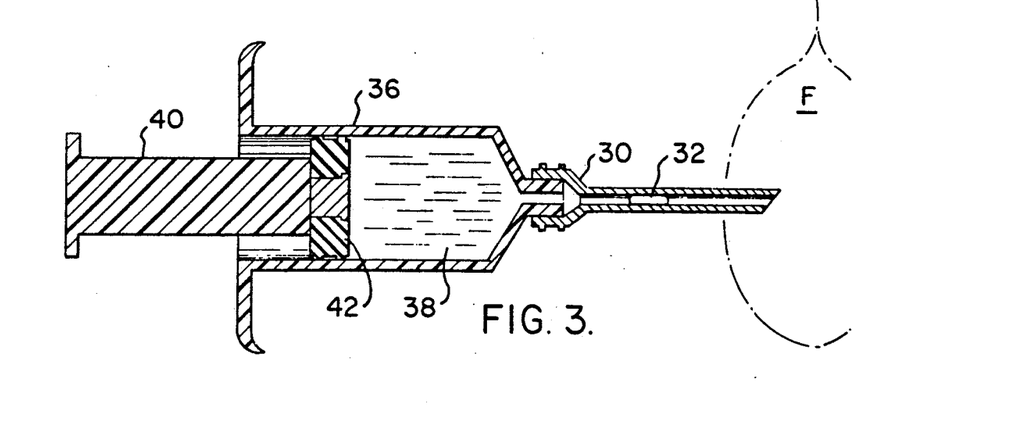
FIG. 3 shows in schematic form a cross-sectional view of a hypodermic syringe, together with the cannula/transponder assembly of FIG. 2, and illustrating how this assembly may be used to inject the transponder into a fish or the like without the necessity of a surgical procedure.

FIG. 3 shows the assembly of the cannula 30 with the transponder 32 therein having been assembled to a syringe 36. A fluid 38, which may be antiseptic and/or antibiotic, may be used to force the transponder 32 into an animal such as a fish shown in phantom at F, simultaneously impelling the transponder into the animal and sterilizing the wound, such that the chance of infection is substantially minimized. In other respects, the syringe is conventional, comprising a plunger 40 moving a piston 42 to urge the fluid 38 and hence the transponder 32 into the animal upon depressing thereof by the operator.

It will be appreciated that FIG. 3 is to be considered schematic and not as a limitation on the invention. Specifically, the syringe may also simply urge the transponder 32 into the animal F by means of a rod, attached to the plunger 40, eliminating the fluid 38. Other forms of implantation are also possible, including the provision of a number of cannula/transponder assemblies in a magazine supplied to an automatic-loading injection device. Use of the term "syringe-implantable" or the equivalent herein and in the appended claims should therefore not be taken to limit the invention to the precise arrangement shown in FIG. 3.

Figures 4, 5:
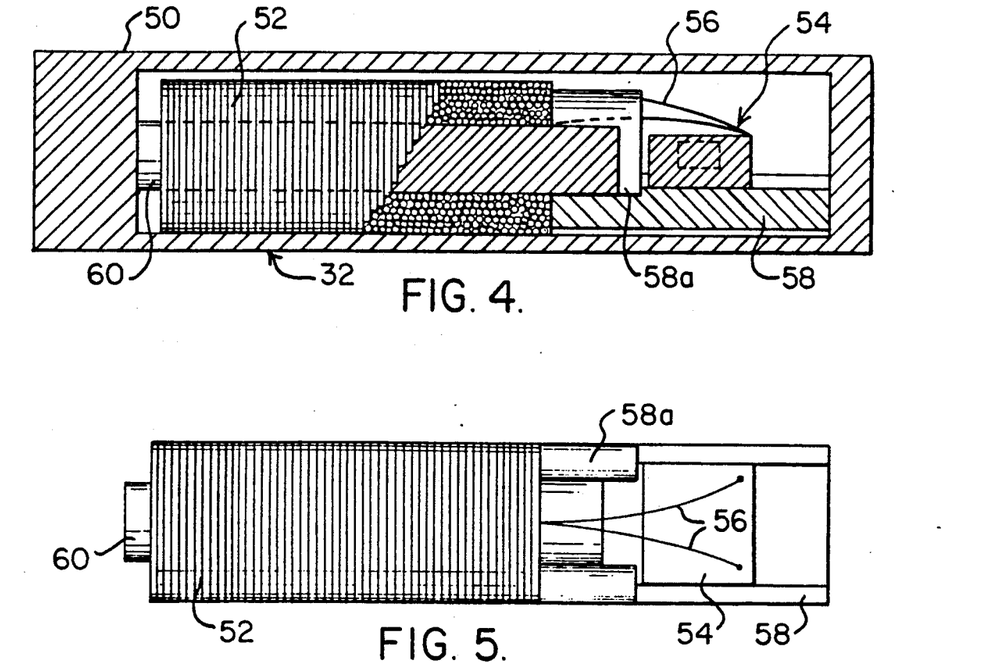
FIG. 4 shows a cross-sectional view of the transponder assembly according to the invention.
FIG. 5 shows a plan view of the active components of the transponder of the invention.

FIG. 4 shows a partly cross-sectional view of the transponder 32 according to the invention. It comprises an outer encapsulating member 50 which may be formed of glass, a coil 52, an integrated circuit chip 54, leads 56 connecting the chip 54 to the coil 52, and a support member 58. The coil 52 is wound upon a coil former 60. Glass encapsulation is preferred because glass is non-porous, corrosion-resistant, and amenable to sterilization, as compared to other possible encapsulation materials such as plastic. Glass encapsulation of transponders is generally within the skill of the art; see U.S. Pat. No. 3,935,612 to Fischer et al.

As discussed above, it is important to the achievement of the objects of the invention that the transponder 32 be small enough physically to be implantable by means of a syringe, in order to avoid surgical procedures. The assembly shown in FIG. 4 is of outside diameter between 0.081–0.083 inch, and is approximately 0.405 inch long. The coil 52 comprises 1,200 turns of 50-gauge aluminum wire, the conductor of which is 0.001 inch in diameter. The coil former 60 is formed of ferrite and is approximately 0.030 inch diameter by approximately 0.20 inch long. The result is a coil of approximately 6,500 microhenry inductance at the preferred interrogation frequency of 400 kHz, and having a DC resistance of approximately 250 ohms. The outside diameter of this coil 52 is approximately 0.063 inch, and it fits within the encapsulating housing with a small amount of room to spare, as shown. The coil is suitable for both detecting the interrogation signal and for transmitting the identification signal.

The integrated circuit chip 54, the circuitry of which is discussed in detail below, is 0.045 inch square. It is a completely self-contained unit and contains all the circuitry necessary to perform the transponder functions, including responding to the interrogation signal, storing an identification code, reading back the code when interrogated, generating appropriate signal frequencies for frequency-shift-keyed transmission of the code to the interrogator, and providing the appropriate identification signal sequence. In particular, no storage capacitor and no crystal oscillator or other discrete circuit elements are required.

Figure 6:
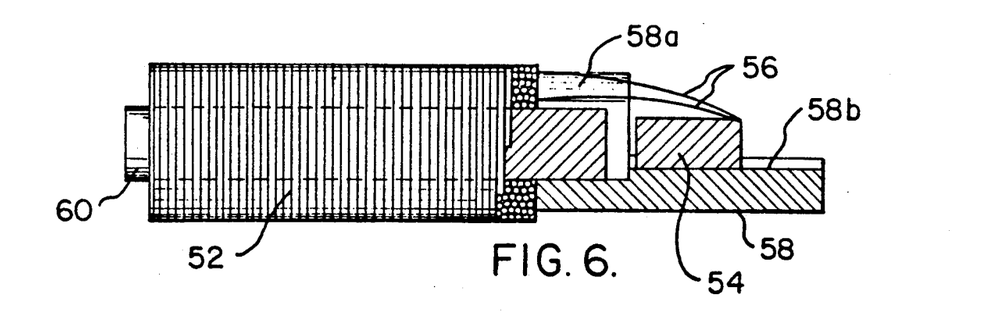
FIG. 6 shows a side view of the active components of the transponder of the invention.
Figure 7:
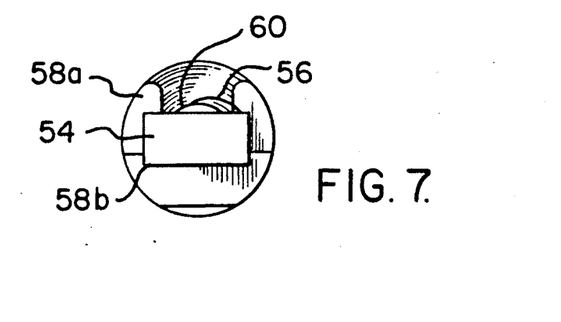
FIG. 7 shows an end view of the active components of the transponder of the invention.

FIG. 5 shows a plan view of the coil/chip/carrier assembly, with the encapsulating glass member 50 removed. FIG. 6 shows a side view of the coil/chip/carrier assembly, and FIG. 7 shows an end view. As can be seen, the entire connection of the coil 52 to the chip 54 is made by the two leads 56. These both carry power received from an interrogator by way of an inductive coupling to the coil 52 to the chip 54, and carry the identification signal from the integrated circuit 54 back to the coil 52 for transmission to the interrogator.

As can be observed, the carrier 58 comprises two upstanding ears 58a which are generally circular in their peripheral shape so as to fit within a circular glass tube used to form the encapsulating member 50. The carrier 58 is shaped to receive the integrated circuit chip 54 in a recess 58b formed therein, and the upstanding ear members 58a are shaped to receive the generally cylindrical coil former 60, all generally as shown in FIG. 7.

Note that while a transponder of cylindrical shape, 0.400 inch long and 0.080 inch O D has been described, other shapes and somewhat larger or smaller sizes would presumably also be useful. It is believed however that the transponder to be suitably syringe-implantable should be no more than about 0.5 inch long and should have a cross-sectional area of not more than about 0.01 square inches. (The 0.080 inch OD transponder of the invention has a cross-sectional area of approximately 0.005 square inches). The invention should therefore not be limited to the precise embodiment shown.

Figures 8A, 8B, 8C, 8D, 8E:
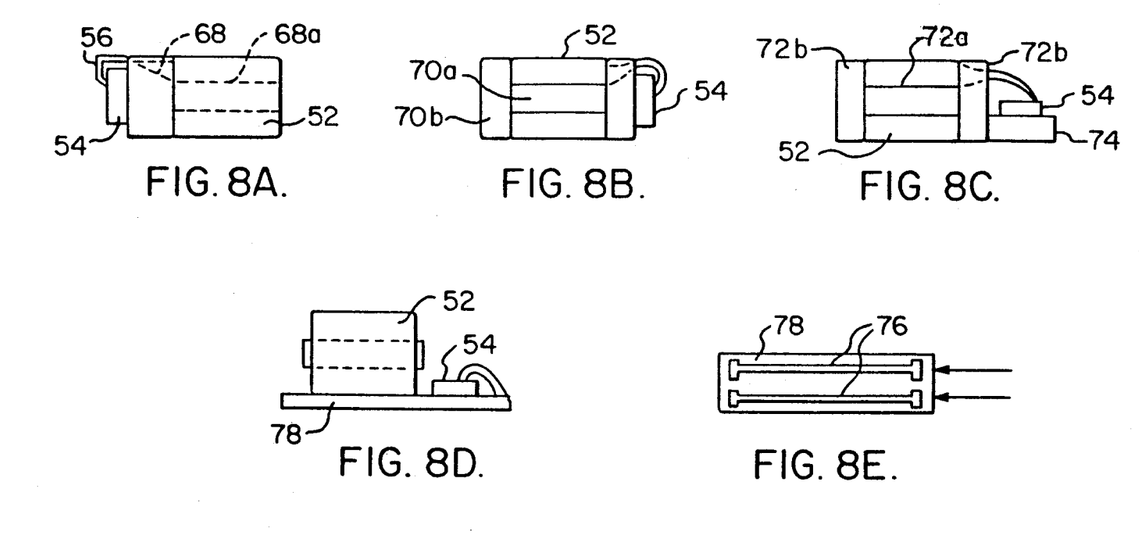
FIGS. 8a–8e, shows certain alternative arrangements of the active elements of the transponder of the invention.

FIG. 8, comprising FIGS. 8a–8e, shows a number of additional arrangements for the active elements of the transponder of the invention. In FIG. 8a, the integrated circuit chip 54 is mounted on a carrier 68 which desirably will be integrally formed with the coil former 68a so as to eliminate a part. The leads 56 connect the chip to the coil 52 as shown.

FIG. 8b shows an additional variation on the embodiment shown in FIG. 8a, in which the coil former 70a is generally cylindrical and has a center section of reduced cross-sectional dimension and larger end members 70b. The integrated circuit chip 54 is attached to one of the end members 70b.

FIG. 8c shows yet another variation on this concept, in which the coil former again has a center section 72a of reduced cross-sectional area and larger ends 72b; in this case, the integrated circuit 54 is mounted on an extension member 74, which could be integral with the coil former 72 or be a separate piece, as desired.

FIGS. 8d and 8e show, respectively, side and bottom views of yet another possible embodiment of the invention. In this case, the connection from the coil 52 to the integrated circuit 54 is made by way of two conductive "traces" 76 formed on one side of a circuit board 78 to which are mounted the coil 52 and integrated circuit 54. The circuit board material could be chosen from a wide variety of suitable materials, including glass, ceramics, plastics and epoxy.

Figure 9:
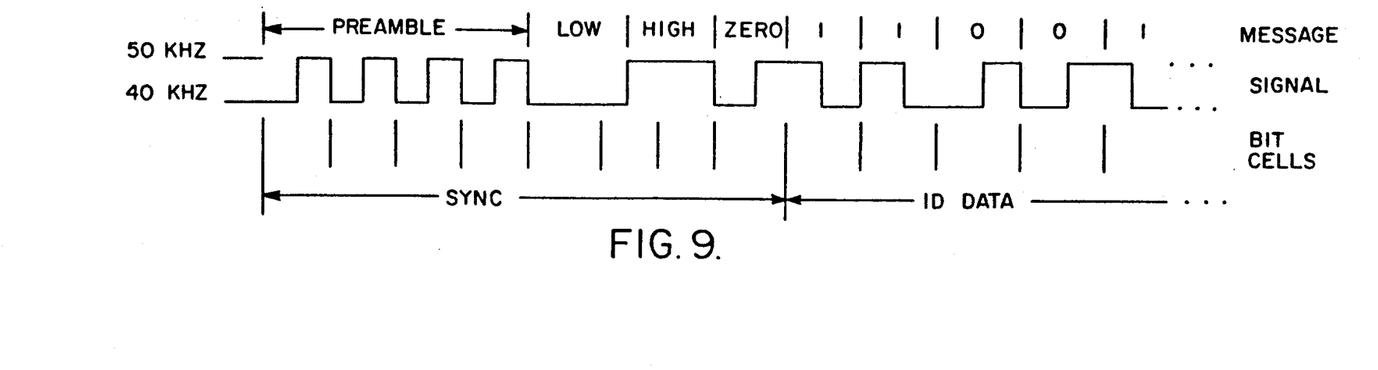
FIG. 9 shows the data encoding and communications format employed in the preferred embodiment of the invention.

In the preferred embodiment of the invention, the signal by which the transponder transmits an identification code identifying the particular transponder and hence the animal into which it is implanted, is in a conventional frequency-shift-keyed, Manchester encoded format. The communications format is shown in FIG. 9, which illustrates, on the line marked "Signal" the frequency of the signal transmitted by the transponder and detected by the interrogator. The signal includes a synchronization portion, marked "Sync", and an identification data portion, marked "ID data." The sync portion includes a preamble which includes four identical bits, a low portion during which the frequency stays low for a period longer than the bit cells, as indicated, a similar high portion, and a zero data bit. The actual identification code begins thereafter as indicated. For example, five data bits, encoding the sequence "11001 . . . " are shown. As indicated, the Manchester encoding scheme is implemented such that for a "one" bit, the transmission frequency changes from the higher frequency to lower during the bit cell; the converse is true for a "zero" bit.

In the preferred embodiment, the interrogation frequency is 400 kHz, and the two identification signal transmission frequencies are 40 and 50 kHz. The integrated circuit 54 comprises means for selectively dividing the interrogation frequency by 8 and 10, to arrive at the desired frequency of the identification signal. Other interrogation frequencies and divisors are within the scope of the invention.

Figure 10:
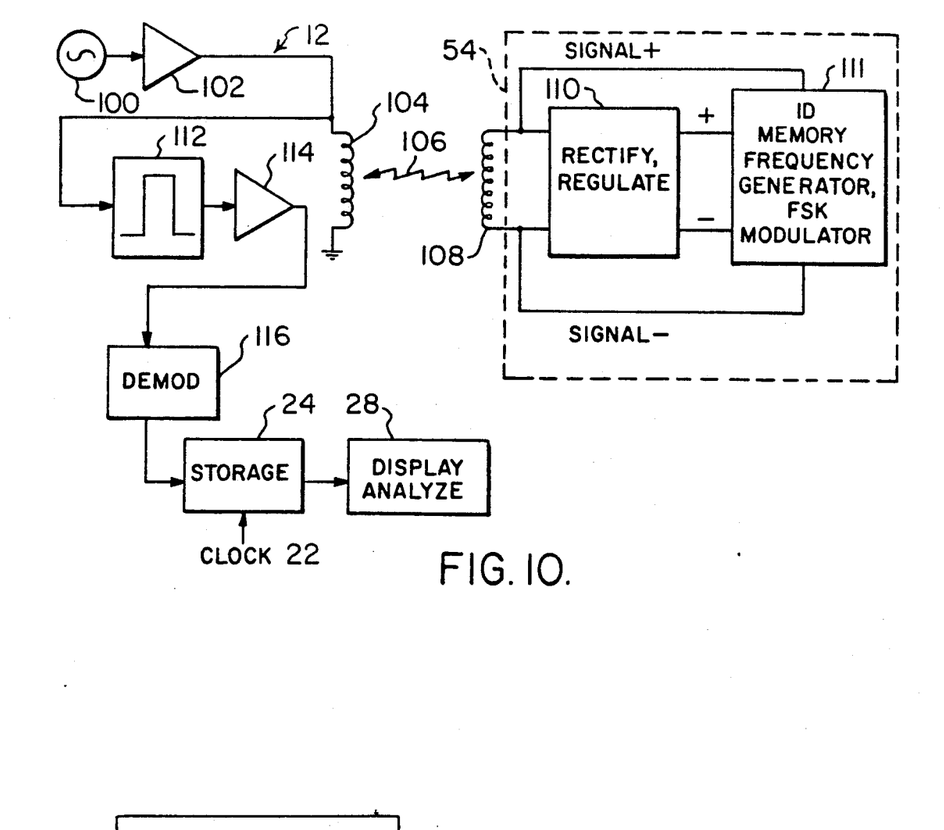
FIG. 10 shows a block diagram of the interrogator and transponder circuits according to the invention, as well as certain monitoring system components.

FIG. 10 shows in block diagram form the circuitry of the transponder, indicated generally at 32, and that of the interrogator, indicated generally at 12, together with storage device 24, clock 22 and display generation device 28, generally as shown in FIG. 1. The interrogator circuitry is substantially as disclosed in commonly assigned copending application Ser. No. 814,492, filed Dec. 30, 1985, now U.S. Pat. No. 4,730,188 incorporated herein by reference. Briefly stated, the interrogator 12 comprises a signal source 100 which generates a sine wave of 400 kHz, and an amplifier 102. The interrogation signal is supplied to the interrogator coil 104, which transmits it as indicated at 106 to coil 108 (corresponding to coil 52 of FIGS. 4-8) whereupon the interrogation signal is inductively coupled to the transponder 32. The interrogation signal received by coil 108 is supplied to a single integrated circuit 54 in which it is rectified and regulated as indicated at 110, supplying DC voltage for the remaining functions of the chip 54, as indicated at 111. The other functions of the chip 54 as noted are to store the identification of the individual transponder, to generate signals of suitable frequency for transmission of the identification code, and to modulate the transmission frequency in accordance with the stored code and according to the frequency-shift-keyed Manchester encoded format shown in FIG. 9. Chip 54 provides "Signal +" and "Signal −" signals which are supplied to and transmitted by the coil 108 as indicated at 106. The identification signal is received by the coil 104 in the interrogator. The received identification signal is supplied to a bandpass filter 112 to remove any vestige of the interrogation signal. The bandpass-filtered identification signal is then amplified at 114, and is demodulated at 116. This provides an identification of the animal, which can then be stored at 24, together with a time stamp from clock 22, indicating the time at which the animal passed by the interrogator. Subsequently, this data can be supplied to display and analysis unit indicated generally at 28 for any desired purpose.

Figure 11:
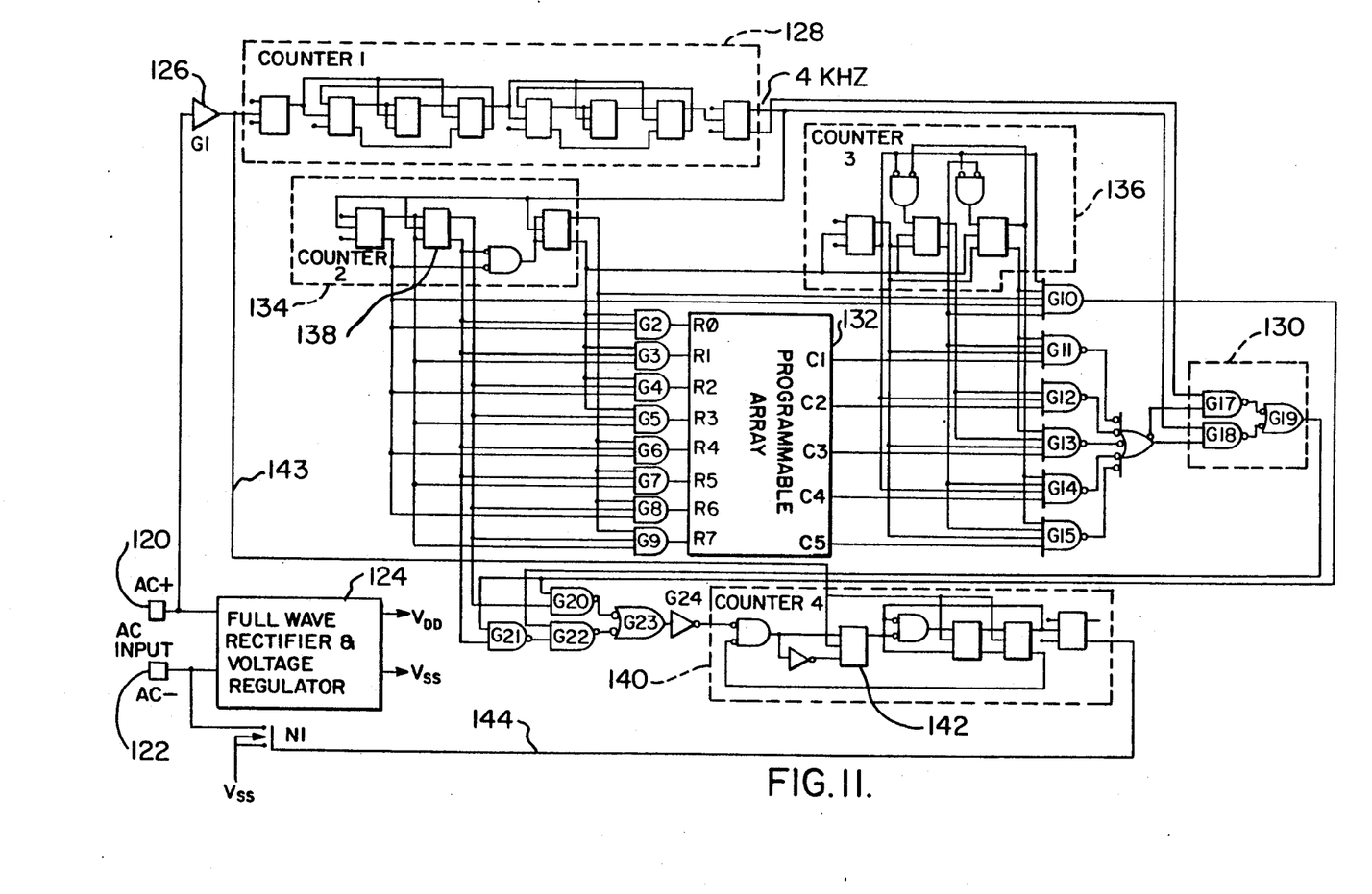
FIG. 11 shows a logic-level diagram of the transponder circuitry according to the invention.

FIG. 11 shows a logic diagram of the circuit of the transponder according to the invention. The circuit shown in FIG. 11 shows logic gates and other circuit elements which, as will be understood by those of skill in the art, are readily implementable on a single integrated circuit chip by selecting the desired items from a "cell library" and making appropriate interconnections. Implementation of the circuit shown in FIG. 11 in a single integrated circuit is therefore considered to be within the skill of the art at this time; however, FIGS. 12 and 13 disclose in further detail certain circuit elements which may be of use in understanding the implementation of the invention.

The circuit shown in FIG. 11 is connected to the coil at terminals 120, 122, marked "AC Input." The AC input signal, of course, is the 400 kHz interrogation signal generated by the interrogator 12 of FIG. 10. This signal is rectified and voltage-regulated at 124 resulting in generation of steady DC at points $V_{DD}$ and $V_{SS}$. The AC input frequency signal is also supplied to a Schmitt trigger circuit 126 which, as understood by those skilled in the art, suppresses clock jitter on the rising edge of the AC power waveform. The rectifier/regulator 124 and the Schmitt trigger 126 are detailed in FIG. 12. The output of Schmitt trigger circuit 126 is supplied to a first counter circuit 128 which comprises a number of J,K flip-flops connected as shown to divide the input signal by 100, in order to generate a 4 kHz output signal. This output signal defines the bit cells during which the individual bits of the identification signal shown in FIG. 9 are transmitted, and is supplied to several logic gate elements which as connected comprise a Manchester encoder 130, all as will be readily understood by those of skill in the art.

The identification code is stored in a 40 bit programmable array 132, which is detailed below in connection with FIG. 13. It has supplied to it eight inputs R0-R7; these are sequenced by a second counter 134 comprising a number of J,K flip-flops connected as shown, in conjunction with a number of logic gates G2-G9. When the logic comprising gates G2-G9 and counter 134 together provide appropriate inputs to the 40-bit array 132, selecting one of eight rows each storing five bits, the five bits of identification code stored on the selected row are output on lines C1-C5. One of these five bits is then selected by gates G11-G15 which are themselves sequenced by a third counter 136. The third counter 136 also provides the preamble information shown in FIG. 9; as this is the same with respect to all transponders, it is hard-wired as shown. By comparison, the identification signal stored in gate array 132 varies from transponder to transponder, in order to provide identification of the individual animal.

The outputs of gates G11-G15 are supplied to gate G16 which combines and buffers them and supplies them to the Manchester encoder 130. The output signal from Manchester encoder 130 is supplied to gate G22 which receives as its other input the $\overline{Q}_1$ output of flip-flop 138 of the second counter 134, clocked by gate G21. The $Q_1$ and $\overline{Q}_1$ outputs of flip-flop 138 determine whether preamble or identification information is being sent at any given time; $Q_1$ from 138, by way of gate G20, controls the flow of the preamble information, supplied to G20 from the third counter 136 by way of gate G10. Gates G20 and G22 therefore gate the preamble and identification information respectively to gates G23, G24 and thence to a fourth counter 140. Counter 140 divides the input signal, received from the Schmitt trigger 126 on line 143, by either 8 or 10, depending on the input to flip-flop 142, which toggles the divisor between 8 and 10 in dependence on the value of the signal output by gate G24. Accordingly, the data supplied by gate G24 controls the frequency of the signal output by counter 140 on line 144 to be between 40 and 50 kHz, in accordance with the Manchester encoded frequency-shift-keyed identification signal format described above in connection with FIG. 9. This signal is supplied to output driver N1 which then supplies the identification signal to the coil, which is connected to terminals 120, 122 as discussed above. Given that the logic of the circuit is fully shown in FIG. 11, it is believed that additional operational details of the transponder circuit will be readily apparent to those of skill in the art.

Figure 12:
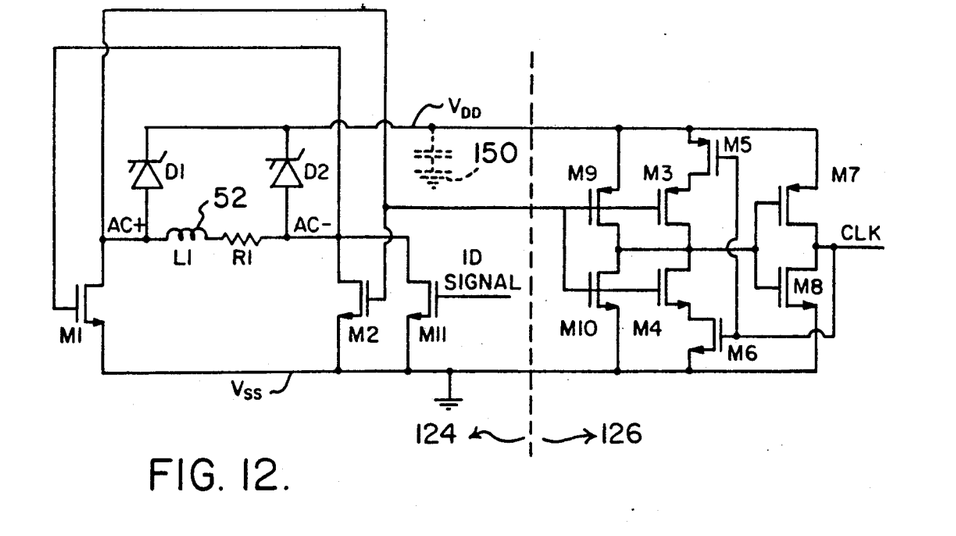
FIG. 12 shows a detailed schematic diagram of the rectification and regulation circuitry used, and that of a Schmitt trigger circuit employed in the transponder of the invention.

FIG. 12 shows in detail the circuitry of the full wave rectifier and voltage regulator 124, and the circuitry of the Schmitt trigger circuit 126, both shown in block diagram form in FIG. 11. FIG. 12 also shows the coil 52 and its connection to the remainder of the transponder circuitry explicitly. As shown in FIG. 12, coil 52 is connected in the center of a full wave bridge rectifier formed by diodes D1 and D2 and N-channel devices M1 and M2, so that a DC voltage is generated between points $V_{DD}$ and $V_{SS}$ as shown. Diodes D1 and D2 are Zeners, as shown, to provide voltage regulation, while M11 is the output driver (N1 in FIG. 11).

The Schmitt trigger circuitry 126 comprises transistors M3-M10 which are connected as shown, in a conventional CMOS Schmitt trigger implementation. The output signal is identified as "CLK"; this is the signal input to the first counter 128 and to the flip-flop 142 of FIG. 11.

As shown in phantom at 150, a capacitance exists between $V_{DD}$ and $V_{SS}$. The showing of this capacitance in phantom is meant to indicate that the capacitance is not provided by a discrete circuit element but is the parasitic capacitance which exists as an unavoidable incident of the use of CMOS circuitry. According to an important aspect of the invention, a discrete capacitance is not specifically required for energy storage for transmission of the interrogation signal, because the transponder of the invention responds essentially in real time to the detection of an interrogation signal, and therefore does not need to store energy for subsequent transmission. This is in comparison, for example, to the large discrete capacitor required in the Hanton et al. patent discussed above. The parasitic capacitance 150 aids in smoothing the transitions of the output signal from the bridge rectifier formed by diodes D1-D2 and transistors M1 and M2, and in retaining charge between $V_{DD}$ and $V_{SS}$ during the zero crossings of the AC power signal. Again, it is believed that detailed understanding and implementation of the circuitry shown in FIG. 12 is well within the skill of the art.

Figure 13:
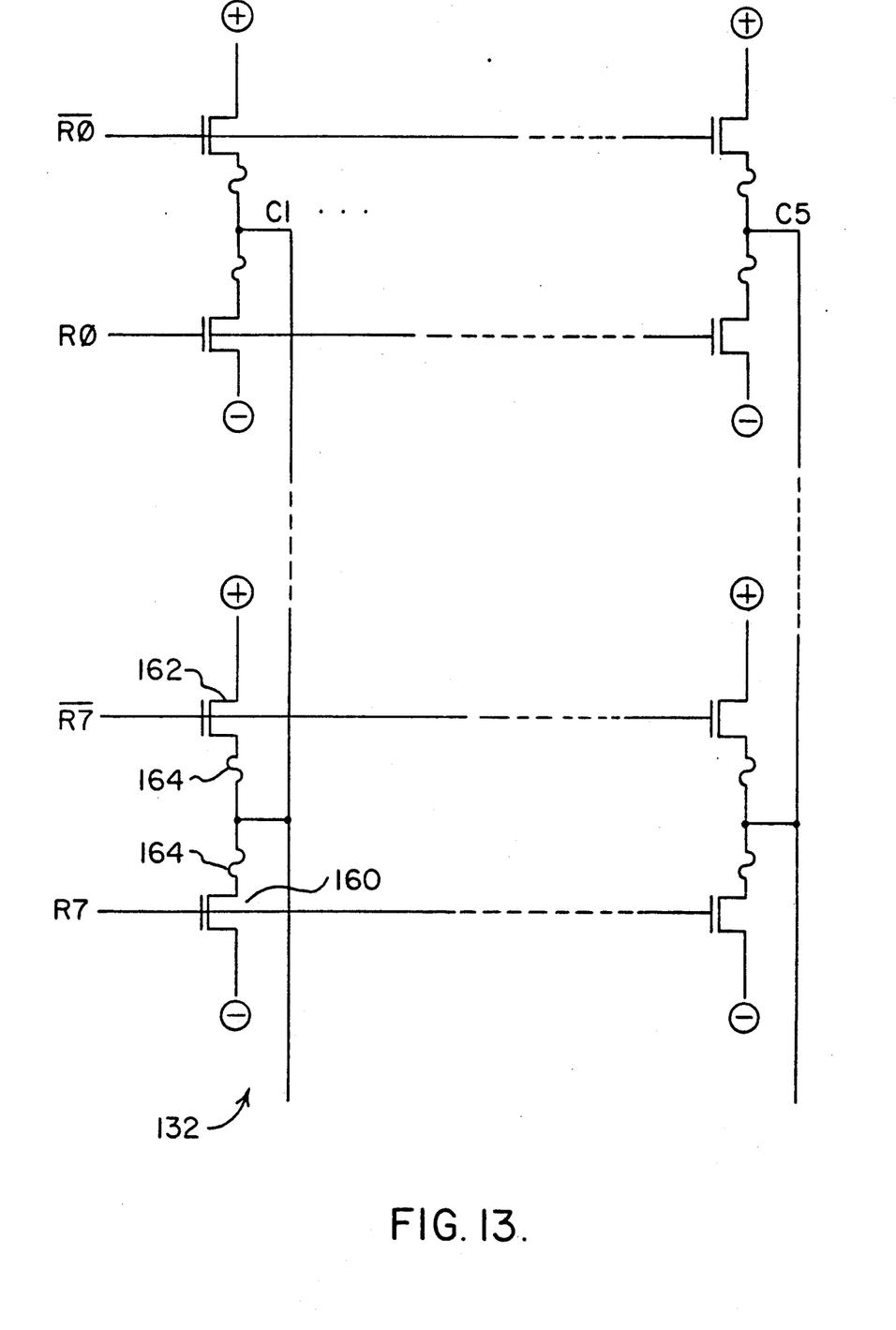
FIG. 13 details the programmable array circuit which stores the identification code.

FIG. 13 shows the programmable array 132. As discussed above, the array comprises storage for 40 bits of identification code. Each of the bits is stored in an individual cell, each comprising two transistors. The 40 cells are arranged in an 8-by-5 matrix, the corner elements of which are shown in FIG. 13. As indicated, each of the cells comprises two transistors 160, 162 each of which is connected by a fusible link 164 to one of five common bus lines denoted C1-C5, while the gates of the transistors are each connected to one of positive and negative row select lines $\overline{R0}$-R7. Each of the transistors 160, 162 of each cell is connected to a source of positive or negative potential. Bits are stored in the cells by "blowing" one or the other of the fuses 164 of each cell, either by applying an overvoltage thereto or by laser vaporization or the equivalent. Thereafter, each cell can pass only positive or negative voltage when interrogated by connection to one of the row select lines $\overline{R0}$-R7 and one of the column select lines C1-C5. Thus, interrogation of the programmable array 132 is accomplished by sequentially connecting $\overline{R0}$-R7 and C1-C5; after each of the 40 possible combinations has been addressed, the entire interrogation signal will have been read out of the array 132. Again, it is believed that detailed understanding of the operation of the array 132 and its implementation are well within the skill of the art. Note that at any given moment, when one of the row select lines $\overline{R0}$-R7 are selected, there will be five outputs, one on each of the column select lines C1-C5; that which corresponds to the cell being interrogated is selected by the gates G11-G15, operation of which is sequenced by the counter 136 (FIG. 11).

The transponder of the invention now having been described in detail, a number of its advantages over the prior art discussed above can now be more fully explained.

As described above, it is highly desirable that a transponder comprising means for transmitting an identification of a specific animal be provided which is small enough to be syringe implantable. The present transponder meets this goal. There are several aspects of its design which make this possible. As compared with the transponder shown in the Hanton et al. patent discussed above, which also transmits an identification of a specific animal when interrogated, applicants' device makes possible a dramatic size reduction from the 0.75 inch OD by three inch long device of Hanton et al. to the 0.40 inch long by 0.080 inch OD transponder. This is done according to the present invention by eliminating a number of discrete circuit elements. Note in particular that Hanton et al. describe their transponder as including a capacitor for storage of energy received by way of inductive coupling to an interrogator for a time until sufficient energy is present. Hanton et al. disclose that a capacitor of approximately 1,000 microfarads at 6 volts capacity is required. Those skilled in the art will recognize that such a capacitor is typically much larger than applicants' entire transponder. By making a circuit which transmits in real time, that is, substantially immediately upon commencement of interrogation, applicants avoid the need to store substantial quantities of energy, and are enabled to eliminate the discrete capacitor as a circuit element. The circuit described begins transmission of the identification signal after the interrogation signal has been divided by 100 in the first counter 128; if the interrogation signal is 400 kHz, 250 usec after initiation of interrogation. Implementation of applicants' circuit in CMOS technology also enables reduction in total power required, due to that circuit family's generally low power requirements. It will also be appreciated that applicants' system need only transmit a signal over a distance on the order of inches to be functional in applications such as fish migration monitoring, because the fish can be constrained to pass through a relatively small tube or weir in a fish ladder. By comparison, Hanton et al.'s device transmit the identification signal over distances on the order of several feet, which naturally requires more power and substantial energy storage capacity.

The device of Hanton et al. also preferably includes a crystal oscillator for generation of the identification signal. It will be appreciated by those skilled in the art that crystal oscillators generally are not capable of fabrication on the same chip as an ordinary integrated circuit, such that plural discrete components are required. Applicants avoid this by generating their two transmission frequencies by integer division of the interrogation signal in circuit elements formed on the integrated circuit itself. In this way, the requirement of an additional discrete circuit element is avoided in favor of utilization of logic gates fabricated on the chip itself. It will be appreciated that applicants also derive their bit cell timing signal from the interrogation signal by integer division thereof, thus further simplifying this aspect of the device and eliminating additional parts which might be required in other implementations.

Another advantage of applicants' circuit is provided by the fact that the device both receives power and transmits over the same antenna, coil 52, and does so simultaneously. This allows a single coil to serve plural purposes. Transmission of the identification signal at frequencies substantially different from that of the interrogation signal is required to permit this. This in turn requires avoiding use of LC or RC circuits for setting the transmission frequencies. The fact that this can be avoided is another advantage of applicant's use of integer division to generate the transmission frequencies. Other important aspects of the invention will no doubt appear to those skilled in the art.

While a preferred embodiment of the invention has been described, numerous modifications and improvements can be made thereto without departure from its essential spirit and scope. The above disclosure of the invention should be considered exemplary only and not as a limitation on the invention, which is limited only by the following claims.

What is claimed is:

1. A transponder for syringe implantation in a host animal including fish or other living creatures for responding to an interrogation signal from a remote signal generator over a monitoring period extending at least over a plurality of months, comprising:
   (a) a coil for receiving said interrogation signal and for transmitting an identification signal to identify the transponder carrying animal;
   (b) integrated circuit means connected to said coil for
      (i) detecting said interrogation signal;
      (ii) storing an identification code corresponding to said identification signal;
      (iii) producing a second signal from said received interrogation signal at a frequency shifted relative to said interrogation signal frequency;
      (iv) generating said identification signal responsive to said identification code; and
      (v) transmitting said identification signal from said coil at said second signal frequency;
   (c) means for maintaining said coil and said integrated circuit means in predetermined relationship to one another for accommodating passage thereof through the interior of a syringe needle; wherein the length of said transponder is not more than about 0.5 inch and its cross-sectional area is not more than about 0.01 square inches, and
   (d) means encapsulating said coil, said integrated circuit means and said maintaining means as a unit sealed with a material having properties equivalent to glass for preventing leakage of the internal fluids of said host animal into said unit for the duration of said monitoring period.

2. A transponder for syringe implantation into a host animal, consisting essentially of:
   coil means;
   integrated circuit means for storing an identification code and outputting the same upon reception of an interrogation signal by said coil means, and for generating a transmission frequency by dividing the frequency of the interrogation signal;
   carrier means for maintaining said coil and said integrated circuit means in specified physical relationship to one another;
   conductor means connecting said integrated circuit means and said coil; and
   encapsulation means for encapsulating said coil means integrated circuit means, carrier means, and conductor means in sealed relation as a unit and employing a material having characteristics equivalent to glass for preventing leakage of internal fluids of said host animal into said unit for a period of time in excess of several months.

3. The transponder of claim 2, wherein coil former means is formed integrally with said carrier means for maintaining said integrated circuit means and said coil in specified physical relationship.

4. The transponder of claim 3, wherein said encapsulation means is glass.

5. The transponder of claim 2, wherein said transponder is no more than about 0.50 inch long and has a cross-sectional area of not more than about 0.01 square inches.

6. In combination: a cannula adapted to be attached to syringe means; and a transponder comprising coil means for receiving an interrogation signal and for transmitting an identification signal, integrated circuit means for detecting said interrogation signal, and means for storing an identification code and transmitting a signal responsive to said stored identification code in response to detection of said interrogation signal, said coil means and said integrated circuit means being encapsulated together within an enclosure with said enclosure having outside dimensions sufficiently small as to be syringe-implanted into an animal, said transponder and said cannula being packaged together in sterile packaging means.

7. The combination of claim 6, wherein said transponder is located within a tubular portion of said cannula having a sharp end adapted to pierce the skin of an animal.

8. A transponder adapted to be syringe-implanted in a host animal, for responding to an interrogation signal over a monitoring period extending over a plurality of months after such syringe implantation, comprising:
   a coil for radio frequency coupling to an interrogator, for receiving an interrogation signal, and for transmitting a radio frequency identification signal;
   an integrated circuit for detecting an interrogation signal transmitted by said interrogator and received by said coil, for storing an identification code, for generating an identification signal transmission frequency by integer division of the interrogation signal, and for transmitting an identification signal substantially instantaneously upon detection of the interrogation signal, whereby said transmission of the identification signal is accomplished without storage of energy received from said interrogator; and
   means encapsulating said coil and said integrated circuit as a sealed container formed of a material having characteristics equivalent to glass for preventing leakage thereinto of internal fluids in said host animal for the duration of said monitoring period.

9. The transponder of claim 8, wherein the overall dimensions of said container are less than approximately 0.5 inch long with a cross-sectional dimension of less than approximately 0.01 square inches.

10. A syringe implantable transponder for use in an identification system for monitoring a host such as an animal, fish or the like during a monitoring period extending over a plurality of months, said system comprising at least one interrogator adapted to emit an interrogation signal, said transponder comprising:
   a coil adapted to receive said interrogation signal and to transmit an identification signal;
   an integrated circuit chip connected to said coil, said chip comprising memory means for storing an identification code, and transmitter means responsive to said interrogation signal for transmitting said identification signal corresponding to said stored identification code;
   support means formed integrally with an elongated coil former means about which said coil is wound, said support means including means for physically maintaining said integrated circuit chip in specified physical relationship to said coil in an assembly configured for accommodating passage thereof through the interior of a syringe needle; and encapsulation means formed of a material which is transparent to radiation at the frequencies of said interrogation and identification signals and which has characteristics equivalent to glass, for sealing said coil, said integrated circuit chip and said support means therewithin to form a unit dimensioned for injection implantation by a syringe said encapsulating means being constructed of materials impervious to the internal fluids of said host for at least said monitoring period.

11. The transponder of claim 10, wherein said coil is wound upon a generally cylindrical coil former, and said support means comprises a planar portion and ears upstanding from said planar portion, said integrated circuit chip being mounted on said planar portion, and said ears defining a generally cylindrical cavity for receiving an end of said coil former.

12. The transponder of claim 11, wherein said coil former is formed of a ferrite material.

13. The transponder of claim 10, wherein said support means and said coil former means together comprise a first cylindrical portion of a first diameter about which said coil is wound, and a second generally cylindrical portion of a larger diameter, said second cylindrical portion having generally planar ends, said first and second cylindrical portions being formed such that said first cylindrical portion extends from a first generally planar end of said second generally cylindrical portion.

14. The transponder of claim 10, wherein said integrated support means and coil former together are formed in the shape of a spool, comprising a center section of generally cylindrical shape of a first diameter, over which said coil is wound, and first and second end portions both being generally cylindrical and of a diameter greater than said center section, and wherein said integrated circuit chip is mounted on one end portion of said integrated spool shaped support means and coil former.

15. The transponder of claim 14, wherein said integrated circuit chip is directly mounted to one end portion of said integrated spool shaped support means and coil former.

16. The transponder of claim 15, wherein said integrated circuit chip is mounted on an additional support member fixed to one end portion of said integrated spool shaped support means and coil former.

17. The transponder of claim 10, wherein said support means comprises integrated circuit means comprising a substrate on which said coil and chip are mounted, said substrate having conductive traces formed thereon for connecting said integrated circuit chip to leads from said coil.

18. The transponder of claim 17, wherein said coil is wound upon a coil former means.

19. The transponder of claim 18, wherein said coil former means is formed of a ferrite material.

20. A transponder for implantation by injection from a syringe barrel into a host such as an animal, fish or the like, for responding to an external interrogation signal throughout a monitoring period extending over at least a plurality of months after implantation comprising:
 (a) a coil for receiving an interrogation signal and for transmitting an identification signal;
 (b) integrated circuit means connected to said coil for
  (i) detecting said interrogation signal;
  (ii) storing an identification code corresponding to said identification signal;
  (iii) generating said identification signal responsive to said identification code; and
  (iv) transmitting said identification signal; and
 (c) means for maintaining said coil and said integrated circuit means as a unit in predetermined relationship to one another with the external dimensions of said unit allowing passage of said unit through the syringe barrel, wherein said integrated circuit means for generating said identification signal comprises means for dividing said interrogation signal by an integer number, said maintaining means including means employing a material having characteristics equivalent to glass for sealingly enclosing said unit from infiltration by internal fluids of said host for the length of said monitoring period after implantation in said host.

21. The transponder of claim 20, wherein said integrated circuit means further comprises means for generating plural signals of differing frequencies and means for selecting between said plural signals responsive to said stored identification code, for generating said identification signal.

22. The transponder of claim 20, wherein said integrated circuit means further comprises means for generating an identification signal frequency by dividing the frequency of said interrogation signal by a first integer number, and means for determining a transmission bit rate by dividing the frequency of said interrogation signal by a differing integer number.

23. The transponder of claim 22, wherein said integrated circuit means further comprises means for generating plural identification signal frequencies and means for selecting between said plural identification signal frequencies responsive to said identification code.

24. The transponder of claim 20, wherein said integrated circuit means comprises means for transmitting said identification signal substantially instantaneously upon detection of said interrogation signal.

25. The transponder of claim 20, wherein said integrated circuit means further comprises means for dividing said interrogation signal by plural divisors in order to generate plural transmission frequencies; means for dividing said interrogation signal by an additional divisor to generate a bit frequency and to define bit cells for clocking transmission of bits of said stored identification code, and means for switching between said plural divisors responsive to the value of said bits of said stored identification code.

26. The transponder of claim 25, wherein said means for switching is controlled by said integrated circuit to vary the frequency of transmission in the center of each of said bit cells in responsive to specific bit values.

27. A transponder for implantation by injection from the barrel of a syringe into a physiological host such as an animal fish or the like, for responding to an external interrogation signal throughout a monitoring period extending over a plurality of months comprising:
 coil means;
 integrated circuit means for storing an identification code and outputting the same upon reception of an interrogation signal by said coil means, and for generating a transmission frequency by dividing the frequency of the interrogation signal;
 carrier means for maintaining said coil and said integrated circuit in specified physical relationship to one another;

conductor means connecting said integrated circuit and said coil; and encapsulation means of a material having characteristics equivalent to glass for encapsulating said coil means, integrated circuit means, carrier means, and conductor means into a unit having external dimensions for allowing passage of said unit through the syringe barrel with said unit sealed against migration thereinto of the internal fluids of said host throughout said monitoring period after implantation in said host.

* * * * *